US009692615B2

(12) United States Patent
Wasiel et al.

(10) Patent No.: US 9,692,615 B2
(45) Date of Patent: Jun. 27, 2017

(54) FACSIMILE PASSTHROUGH SILENCE SUPPRESSION

(75) Inventors: Maciej Wasiel, Somerville, MA (US); David M. Lash, Waltham, MA (US)

(73) Assignee: Dialogic Corporation, Montreal (CA)

( * ) Notice: Subject to any disclaimer, the term of this patent is extended or adjusted under 35 U.S.C. 154(b) by 1116 days.

(21) Appl. No.: 12/634,335

(22) Filed: Dec. 9, 2009

(65) Prior Publication Data

US 2011/0134914 A1    Jun. 9, 2011

(51) Int. Cl.
 H04L 12/66    (2006.01)
 H04N 1/00    (2006.01)
 H04L 29/06    (2006.01)
 H04N 1/327    (2006.01)

(52) U.S. Cl.
 CPC ........ *H04L 12/66* (2013.01); *H04L 29/06027* (2013.01); *H04L 65/103* (2013.01); *H04N 1/0022* (2013.01); *H04N 1/00209* (2013.01); *H04N 1/00214* (2013.01); *H04N 1/32721* (2013.01); *H04N 2201/0093* (2013.01)

(58) Field of Classification Search
 CPC ............... H04L 12/66; H04L 29/06027; H04L 65/1069; H04L 29/06; H04L 2012/6481; H04L 69/08; H04N 1/00214; H04N 1/0022; H04N 1/00209; H04N 2201/0093; H04N 1/00312; H04N 1/32704; H04N 2201/0086; H04N 1/32719; H04N 1/32721
 USPC .................................................. 370/352–356
 See application file for complete search history.

(56) References Cited

U.S. PATENT DOCUMENTS

| | | | |
|---|---|---|---|
| 6,594,351 B1 * | 7/2003 | Bhogal | H04N 1/32005 358/434 |
| 6,628,429 B1 | 9/2003 | Razazian | |
| 7,126,711 B2 | 10/2006 | Fruth | |
| 2003/0072272 A1 * | 4/2003 | Koide et al. | 370/298 |
| 2006/0227764 A1 | 10/2006 | Miriyala et al. | |
| 2006/0250997 A1 * | 11/2006 | Smith et al. | 370/286 |
| 2006/0268831 A1 * | 11/2006 | Ulybin | 370/352 |
| 2007/0165652 A1 * | 7/2007 | Kimoto | H04M 7/1205 370/401 |

(Continued)

OTHER PUBLICATIONS

"Fax, Modem, and Text for IP Telephony", Chapter 4, David Hanes and Gonzalo Salgueiro, Cisco Press, 2008.

*Primary Examiner* — Melanie Jagannathan
*Assistant Examiner* — Najeebuddin Ansari
(74) *Attorney, Agent, or Firm* — BainwoodHuang

(57) ABSTRACT

A facsimile transmission device implements silence suppression based on a state of a facsimile call and detected facsimile signals. A decision process implemented in the facsimile device can determine when silence suppression should be enabled. The facsimile device may be an IP media gateway connected between a PSTN and an IP network, or may be an IP endpoint. The determination of when to enable silence suppression can be based on the state of sending or receiving facsimile transmissions including facsimile operations and/or signaling. The decisions can be based on the type of facsimile transmission including G3 type or SG3 type facsimile transmissions. By enabling silence suppression during facsimile transmissions, significant reductions in bandwidth requirements can be achieved for the facsimile transmission while maintaining facsimile transmission quality.

20 Claims, 10 Drawing Sheets

(56) References Cited

U.S. PATENT DOCUMENTS

| 2008/0094661 | A1* | 4/2008 | Lee | H04L 1/0007 |
| | | | | 358/1.15 |
| 2009/0009818 | A1* | 1/2009 | Mita et al. | 358/434 |
| 2009/0109881 | A1* | 4/2009 | Li et al. | 370/280 |
| 2009/0122975 | A1* | 5/2009 | Jin | 379/406.01 |
| 2011/0058496 | A1* | 3/2011 | LeBlanc | 370/252 |
| 2011/0141889 | A1* | 6/2011 | Pang et al. | 370/230.1 |

\* cited by examiner

FACSIMILE PASSTHROUGH SILENCE SUPPRESSION

CROSS REFERENCE TO RELATED APPLICATION(S)

(Not Applicable)

STATEMENT REGARDING FEDERALLY SPONSORED RESEARCH OR DEVELOPMENT (Not Applicable)

BACKGROUND OF THE INVENTION

The present disclosure relates generally to facsimile transmission through communication networks, and more particularly to transmission via facsimile in a network with silence suppression.

Facsimile document transmission continues to have an important role in business communications for a number of reasons, including the ability to transfer images not stored on a local computer, legal acceptance of handwritten signatures, real-time confirmation of receipt, confidence in what has been received, and the ability to provide a 'tamper resistant' copy of the information transferred. The ubiquitous nature of facsimile machines on a global scale allows them to easily take advantage of existent telecommunications networks. Facsimile machines may also be shared by a number of individuals so that sending and receiving documents can be relatively efficient among a general population or group of persons.

While facsimile communications have previously been implemented over circuit switched networks, such as the publicly switched telephone network (PSTN), packet switched networks, such as IP networks, have been implemented to carry communications including facsimile communications. Because circuit switched networks enjoyed wide use throughout the world, and packet switched networks have been introduced relatively recently, translation and communication between different types of networks has become an important part of communications, including facsimile communications.

Translation between circuit switched and packet switched communication networks typically involves the use of translation between different protocols. Sometimes, protocols that might be desired for certain types of communications are not supported in all parts of a packet switched network, such as an IP network. For example, a facsimile transmission may be sent from a PSTN-based originator to a facsimile destination through an IP network using an IP media gateway. The facsimile communication is routed to an appropriate destination over the IP network in accordance with the facsimile communication parameters. However, some links in the IP network may not support a desired facsimile transmission protocol.

Referring to FIG. 1, a conventional communication network 100 that permits facsimile transmission is illustrated. In network 100, a facsimile device 110 or a facsimile device 124 may originate or receive a facsimile transmission through analog signalling. For example, facsimile device 110 may originate or receive a facsimile transmission that is sent over a Public Switched Telephone Network (PSTN) 112. Facsimile device 110 or 124 may operate using G3 (Group 3) type facsimile transmissions according to facsimile protocols such as the V.17, V.21, V.27 or V.29 facsimile protocols. Facsimile device 110 or 124 may operate using SG3 (Super Group 3) type facsimile transmissions according to the V.34 facsimile protocol. G3 and SG3 type facsimile communications conform to the ITU (International Telecommunication Union) Recommendation T.30 for facsimile transmission in the general switched telephone network, as may be implemented with network 100. PSTN 112 in network 100 may operate with communication protocols for a circuit switched network, such as SS7, T1, E1 and other circuit switched signalling and data communication protocols.

PSTN 112 is connected to an IP Media Gateway 114, which can perform translations between PSTN 112 and protocols used in an IP network 116. IP network 116 is a packet switched network that may implement the Internet Protocol (IP) routing and addressing methodology to transfer data packets. IP network 116 may implement various transport protocols, which may include UDP, TCP, RTP and other media and data communication protocols for packet switched networks. IP network 116 may be implemented to provide facsimile transmission support with facsimile transmission protocols such as the T.38 protocol for real time facsimile transmission. IP network 116 may include a number of nodes through which a facsimile transmission originating at facsimile device 110 may travel. A facsimile transmission or communication may be composed of facsimile setup or control commands, training data or image data, which may be referred to herein collectively as "facsimile messages."

One or more of the nodes in IP network 116 may not support real time facsimile protocols such as the T.38 protocol. In such a case, IP network 116 relays the realtime facsimile messages using a facsimile passthrough technique that involves other types of protocols and codecs for handling facsimile transmissions originating from the PSTN 112. Currently, the most commonly used facsimile passthrough codecs are the G.711 (64 KBPS) and G.726 (32 KBPS) codecs, which are well suited for facsimile transmission due to the low compression levels involved in implementing the codecs. The low compression levels make it possible for facsimile modem data to be preserved through the compression process with sufficient integrity to permit successful facsimile transmission. The G.711 is currently the most frequently used to implement support for facsimile passthrough communications. The G.711 and G.726 codecs are low in complexity, so that they can be easily implemented, but are not bandwidth efficient relative to codecs that are optimized for voice communications, such as the G.729 codec. Accordingly, the G.711 and G.726 codecs are seldom currently used by carriers and service providers in a communication network to carry voice traffic because of their typically higher bandwidth usage.

The devices connected to IP network 116, such as IP facsimile device 118, IP facsimile server 120, analog telephone adapter 122, which can also serve as an IP Media Gateway, and IP Media Gateway 114 may implement various codecs and/or protocols to provide a variety of communication transmissions. For example, G3 that take advantage of voice activity detection (VAD) during voice calls to reduce network bandwidth utilization. Nodes or IP endpoints of IP network 116 that implement VAD operate by avoiding the transmission of non-speech segments of communications to permit reduced bandwidth usage. For example, during speech oriented telephone calls, the communications tend to be half-duplex in nature. In such a scenario, voice conversation transmissions can readily take advantage of VAD to reduce bandwidth usage that is used to carry voice data, and to avoid carrying communication transmissions that have silence for voice data. This type of silence suppression substitutes "silence" packets for non-speech packets to avoid sending packets that might amplify noise picked up during transmission. Thus, active voice conversations can be carried without also carrying non-speech data, which in turn permits a reduced bandwidth usage for voice conversation type communications to enable communication networks to operate more efficiently.

In the case of modem communications, including facsimile communications, silence suppression or VAD is generally disabled, since it is implemented typically for voice communications, and can have drawbacks for other types of communications, including facsimile communications. For example, silence suppression or VAD can contribute to signal clipping, which can negatively impact modem data being transported in the communication network. Facsimile passthrough calls typically do not use silence suppression or VAD to avoid corruption of facsimile data as a result of valid facsimile signals being suppressed when they are detected as noise instead of voice communications. Accordingly, facsimile passthrough communications in an IP network with nodes that may not support real time facsimile protocols, such as the T.38 protocol, typically consume more bandwidth than is necessary to complete the facsimile communications.

SUMMARY

The present disclosure provides systems and methods for suppressing silence during facsimile passthrough communications by determining a state of a facsimile call and detected facsimile signals. Enabling silence suppression based on the above determination(s) can significantly (and beneficially) reduce bandwidth requirements for facsimile passthrough communications. The determination of a type of facsimile call and protocol in use can be used in a decision making process to perform silence suppression. The decision making process can be implemented in an IP Media Gateway or IP endpoint such as an IP aware facsimile device or facsimile server. The determinations can be made based on the call source, such as a sent or received transmission from/to a PSTN or an IP endpoint sending or receiving facsimile transmissions.

According to an aspect of the present disclosure, an IP Media Gateway is provided that can implement silence suppression as described above in an interface between a PSTN and an IP network. The IP Media Gateway detects the type of facsimile protocol and the facsimile call source and determines when to suppress silence based on the determination and decision process parameters. For example, the IP Media Gateway may detect that the facsimile transmission is type G3 or SG3, and/or that the call source is a PSTN receiving facsimile device or PSTN sending facsimile device.

According to another aspect of the present disclosure, an IP endpoint, such as an IP aware facsimile device or facsimile server, can implement silence suppression by determining a type of facsimile communication and call source. The facsimile communication type and call source are used in a decision making process to decide when to activate silence suppression. For example, the IP endpoint may determine that the facsimile transmission type is G3 or SG3, and that facsimile transmissions are arriving or outgoing at the IP endpoint.

The IP Media Gateway or IP endpoint implementing the decision process of the present disclosure selectively suppresses silence in dependence on the detected facsimile parameters to significantly reduce bandwidth requirements for facsimile communications.

BRIEF DESCRIPTION OF THE SEVERAL VIEWS OF THE DRAWINGS

The present disclosure is described in greater detail below, with reference to the accompanying drawings, in which.

DETAILED DESCRIPTION OF THE INVENTION

Figure 2:
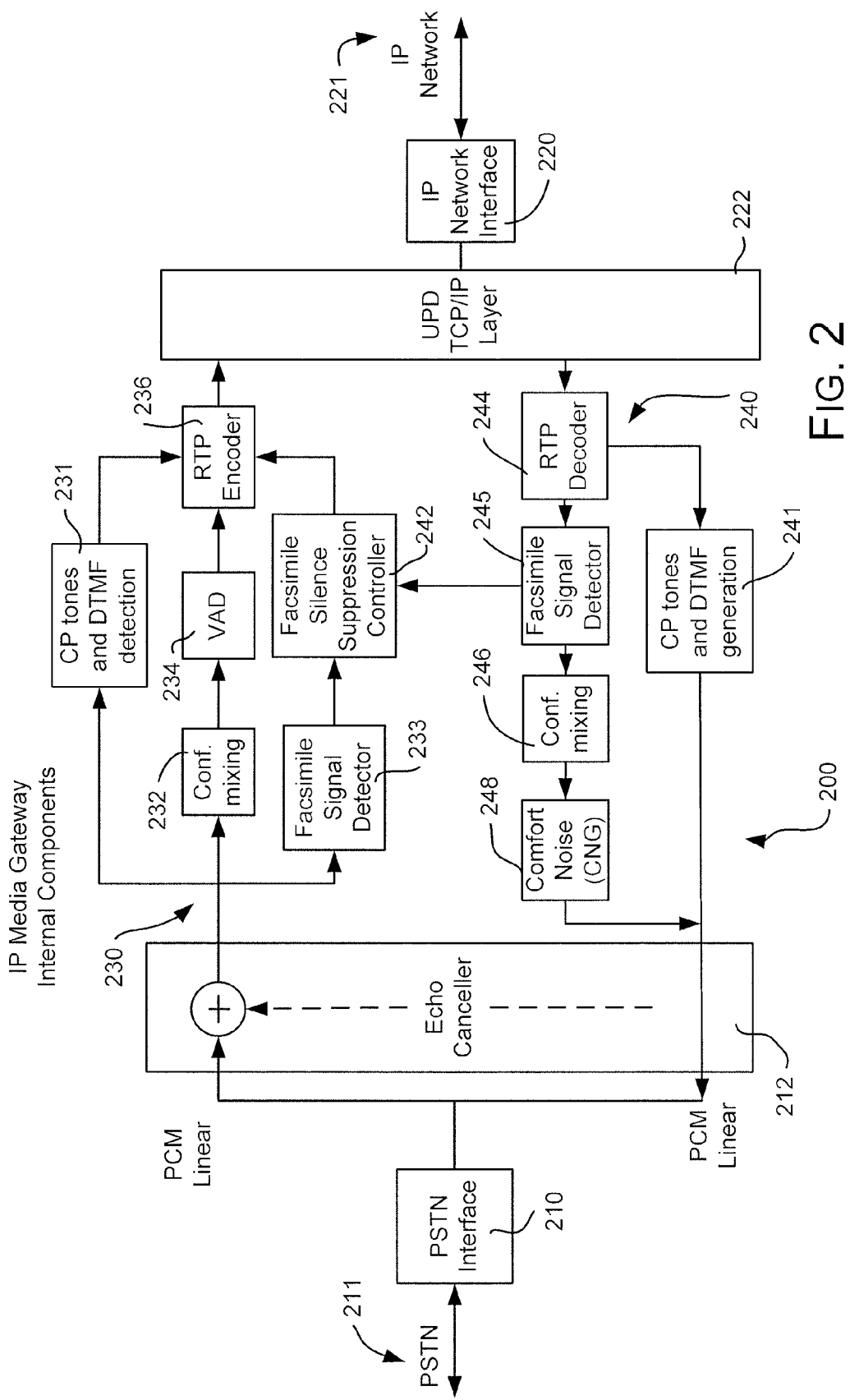
FIG. 2 is a block diagram of an IP Media Gateway that can implement the systems and methods of the present disclosure.

Referring to FIG. 2, a block diagram of an exemplary IP media gateway 200 is illustrated. IP Media Gateway 200 translates between a circuit switched network, or Public Switched Telephone Network (PSTN) 211, and a packet switched network, such as an IP network 221. IP Media Gateway 200 includes a PSTN interface 210, which provides an interface to PSTN 211, and an IP network interface 220, which provides an interface to IP network 221. Interfaces 210, 220 are bidirectional interfaces that provide incoming and outgoing pathways for message transmission from and to their respective network. PSTN interface 210 is coupled to an echo canceller 212, which also provides two-way message communication between IP Media Gateway 200 and PSTN 211. IP network interface 220 is coupled to a UDP TCP/IP layer 222, which permits two-way message communication between IP Media Gateway 200 and IP network 221. Both echo canceller 212 and UDP layer 222 operate on two different pathways through IP Media Gateway 200. One pathway 230 provides a communication route for messages directed from PSTN 211 to IP network 221, whereas a complimentary pathway 240 provides a route for messages directed from IP network 221 to PSTN 211. Pathway 230 includes components to translate PSTN communication network signals to a format that can be used for communication transmissions in IP network 221. It is noted that in accordance with the non-limiting exemplary embodiments discussed and depicted herein, the various systems and methods are operative in IP Media Gateway 200 primarily in pathway 230. The various systems and methods of the present disclosure may involve one or more of pathways 230, 240, as well as a respective RTP encoder 236 or RTP decoder 244. RTP encoder 236 and/or RTP decoder 244 may be viewed as packet handlers or as processing packets in accordance with the disclosed systems and methods for silence suppression. For example, silence suppression may be employed or disabled to respectively prevent or permit sending or receiving of facsimile transmissions.

Figure 1:
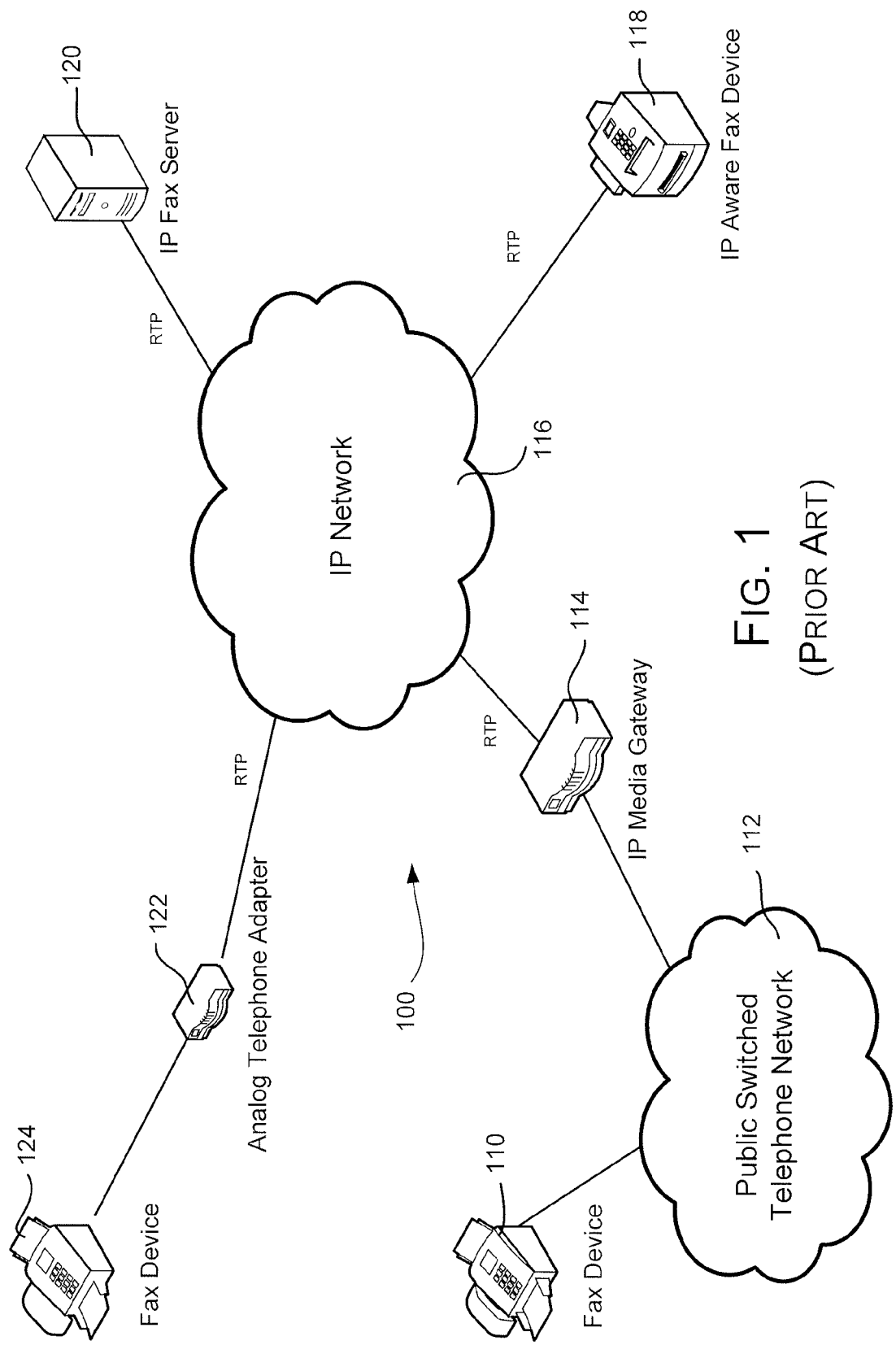
FIG. 1 is a diagram of network components in a conventional communication network with circuit switched and packet switched components.

A communication message originating from PSTN 211 passes through PSTN interface 210 and travels through pathway 230, which, as shown in FIG. 1, includes a conference mixing element 232, a voice activity detection (VAD) element 234 and a real time transport protocol (RTP) encoder 236. Pathway 230 also includes a detection device 231 for detecting call progress (CP) tones and dual tone multi-frequency (DTMF) signalling, as well as a facsimile signal detector 233 that supplies facsimile transmission detection information to a facsimile silence suppression controller 242. Controller 242 is configured and arranged to implement the systems and methods of the present disclosure, as discussed in greater detail below. Controller 242 provides an output to RTP encoder 236 to control silence suppression for transmissions directed to IP network 221.

Pathway 240 provides for communication translation between IP network 221 and PSTN 211 that is complimentary to pathway 230. UDP layer 222 provides communication messages to an RTP decoder 244 that decodes the RTP communication messages for translation to pulse code modulation (PCM) format messages. RTP decoder 244 provides an output to a facsimile signal detector 245 that can detect facsimile communication transmissions in pathway 240. RTP decoder 244 also provides an output to a tone generation device 241, which can generate CP tones and DTMF signalling tones for use in PSTN 211.

Facsimile signal detector 245 provides an output to controller 242 to indicate when a facsimile communication message arriving through IP network 221 is received at IP Media Gateway 200. Facsimile signal detector 245 also forwards the facsimile communication message along pathway 240 to conference mixing element 246 and comfort noise generator (CNG) 248. The PSTN communication format provided by pathway 240 is delivered to echo canceller 212, and onto PSTN interface 210 for transmission across PSTN 211.

Facsimile signal detectors 233 and 245 can operate on different signals to detect a facsimile transmission that is sent from PSTN 211 across IP network 221 (facsimile passthrough) or a facsimile transmission transmitted across IP network 221 to be delivered through PSTN 211. Facsimile signal detectors 233, 245 individually indicate to controller 242 when a facsimile transmission is detected in respective pathways 230, 240. Facsimile signal detector 233 receives a PCM linear input from echo canceller 212, and so may be responsive to PCM linear input signals to detect a facsimile transmission. Facsimile signal detector 245 receives an input from RTP decoder 244, and so may be responsive to decoded RTP data to detect a facsimile transmission. The different format inputs can be detected using different techniques, which include, but are not limited to, techniques for examining the content of call setup messages or packets to determine a type of facsimile transmission. For example, facsimile signal detectors 233, 245 can determine if a G3 or SG3 type facsimile transmission is occurring, based on an examination of the messages transmitted as part of the facsimile transmission. G3 and SG3 type facsimile transmissions have a digital format that can include parametric information. For example, a G3 type facsimile transmission can include parametric information such as V.21 flags. An SG3 type facsimile transmission can include parametric information such as facsimile CM (Call Menu) signals. Facsimile signal detectors may detect a facsimile transmission based on the parametric information associated with a given transmission, such as the above-mentioned V.21 flags or CM facsimile signals, or based on a given transmission code, protocol, identifier, or other transmission content. In each case, controller 242 can, upon receiving an indication of a facsimile transmission, provide signalling to RTP encoder 236 to control silence suppression for facsimile transmissions that are outputted by RTP encoder 236 in pathway 230.

When a facsimile transmission is detected by IP Media Gateway 200, facsimile signal detector 233 and/or facsimile signal detector 245 provide an indication to controller 242 regarding detection and parameter values for the facsimile transmission. Controller 242 then makes decisions based on the silence suppression decision process of the present disclosure to indicate to RTP encoder 236 when facsimile transmissions to IP network 221 should be suppressed. The decision process and operations of controller 242 are described in greater detail below.

Figure 3:
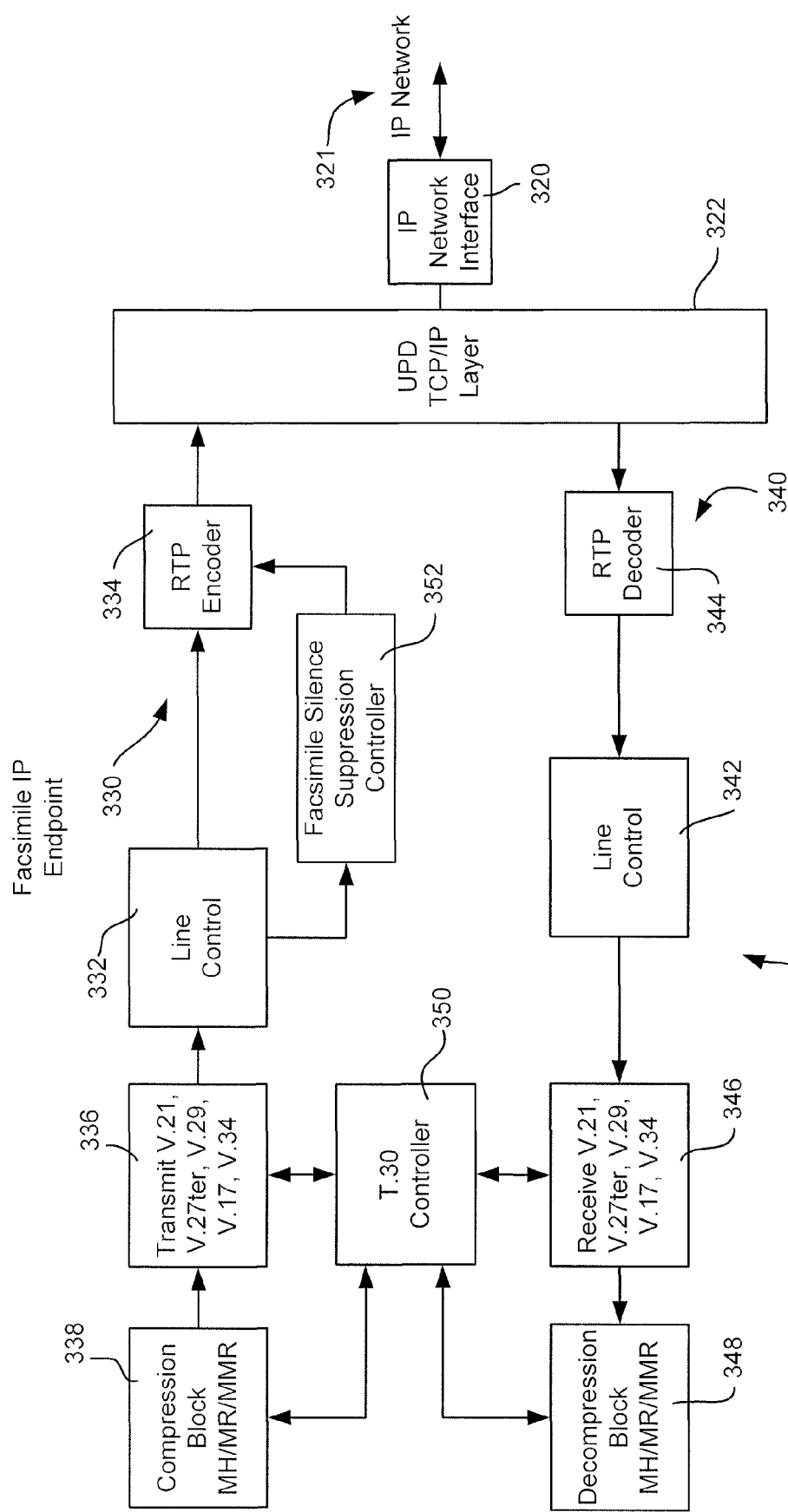
FIG. 3 is a block diagram of an IP end point for facsimile communication illustrating an implementation of the present disclosure.

Referring now to FIG. 3, a block diagram of an IP endpoint 300 for sending and receiving facsimile transmissions in accordance with an exemplary embodiment of the disclosed systems and methods is illustrated. IP endpoint 300 (e.g., a facsimile IP endpoint) is connected to a packet switched network, such as an IP network 321. IP endpoint 300 has an IP interface 320 that is bidirectional for sending and receiving messages between IP endpoint 300 and IP network 321. IP network interface 320 is coupled to a UDP TCP/IP layer 322, which permits two-way message communication between IP endpoint 300 and IP Network 321. In particular, layer 322 receives outgoing facsimile messages through pathway 330, and provides incoming messages to pathway 340. Pathways 330, 340 implement sending and receiving constructs for facsimile transmissions and messages to realize an IP aware facsimile device.

An RTP decoder 344 in pathway 340 decodes facsimile transmissions, the content of which is passed to a line control 342, which handles line signalling to implement the various facsimile or modem protocols. Received facsimile transmissions are further transferred to a protocol receiver 346, which can extract facsimile data from the facsimile transmission packets according to the various facsimile modem standards, such as the V.17, V.21, V.27, V.29 or V.34 protocols. Protocol receiver 346 exchanges control messages with IP endpoint controller 350, which implements the T.30 control for a facsimile call or session. Protocol receiver 346 also transfers extracted facsimile data to a decompression mechanism 348, where the received facsimile data is decompressed from its compressed transmission state to recover the originally transmitted facsimile data. Decompression mechanism 348 also exchanges control messages with T.30 controller 350.

Outgoing facsimile transmissions from IP endpoint 300 are provided through pathway 330 beginning with a compression mechanism 338. Compression mechanism 338 takes facsimile data as input and compresses the data to permit more efficient facsimile transmission operations. The compressed facsimile data is provided to a protocol transmitter 336, where the modem protocol in use is applied to produce facsimile transmission data in accordance with the desired modem protocol, e.g., V.17, V.21, V.27, V.29 or V.34 modem protocols. Compression mechanism 338 and protocol transmitter 336 exchange control information with T.30 controller 350 to arrange the outgoing facsimile data transmission. The facsimile transmission data is applied to a line control 332, which determines line operation for facsimile data transmission. Line control 332 provides an output to an RTP encoder 334, which generates packets to layer 322 for transport over IP network 321. Layer 322 provides the transport mechanism for packetized data to be transmitted over IP network 321 through IP network interface 320.

Line control 332 has an output provided to a facsimile silence suppression controller 352 to indicate when silence is to be transmitted, or when IP endpoint 300 is in an idle transmission state. Sometimes, IP endpoint 300 transmits silence when in an idle state, as determined, for example, by controller 352. Controller 352 provides control signals to RTP encoder 334 to disable or prevent transmission of silence based on the indication from line control 332 that silence is being supplied to RTP encoder 334 for transmission. By avoiding the transmission of silence, IP endpoint 300 can reduce the amount of data being transmitted on IP network 321, thereby reducing the bandwidth requirements for transmissions.

Controller 352 can also determine the type of facsimile being transmitted from IP endpoint 300 to IP network 321, e.g., G3 or SG3 type facsimile transmissions. For example, detection of G3 or SG3 type facsimile transmissions can be built into the operation of controller 352. When controller 352 detects a G3 type facsimile transmission, silence can be suppressed on that basis alone. For example, when G3 type facsimile data transmissions are to be provided from IP endpoint 300 to IP network 321, controller 352 can determine whether facsimile data is being sent or received during the facsimile call session based on the state of line control 332. If IP endpoint 300 is receiving facsimile data from IP network 321, then controller 352 instructs RTP encoder 334 to suppress all outgoing transmissions, which serves to automatically suppress silence. Controller 352 can be configured for this type of operation based, for example, on the half duplex nature of G3 facsimile transmissions—that is, while IP endpoint 300 is receiving facsimile transmissions, there are no outgoing facsimile data transmissions in accordance with the G3 standard, which permits RTP encoder 334 to be disabled.

The presently disclosed facsimile passthrough silence suppression decision process can suppress silence during G3 and SG3 facsimile calls. The decision process is designed to work with legacy or known G3 and SG3 facsimile signal detectors, which may be implemented as facsimile signal detectors 233 or 245 (FIG. 2). The execution of the decision process may depend upon the type of the facsimile call, the type of entity performing the silence suppression and/or the originator of the facsimile call. Table 1 below summarizes different exemplary execution pathways of the decision process that may occur based on the various parameters discussed above.

TABLE 1

| Decision Process to Execute | Type of Entity | Message Source | Type of Facsimile |
|---|---|---|---|
| A | IP Media Gateway | PSTN Receiving Facsimile | G3 |
| B | IP Media Gateway | PSTN Sending Facsimile | G3 |
| C | IP Endpoint | Receiving Facsimile | G3 |
| D | IP Endpoint | Sending Facsimile | G3 |
| E | IP Media Gateway | PSTN Receiving Facsimile | SG3 |
| F | IP Media Gateway | PSTN Sending Facsimile | SG3 |
| G | IP Endpoint | Receiving Facsimile | SG3 |
| H | IP Endpoint | Sending Facsimile | SG3 |

Figure 4:
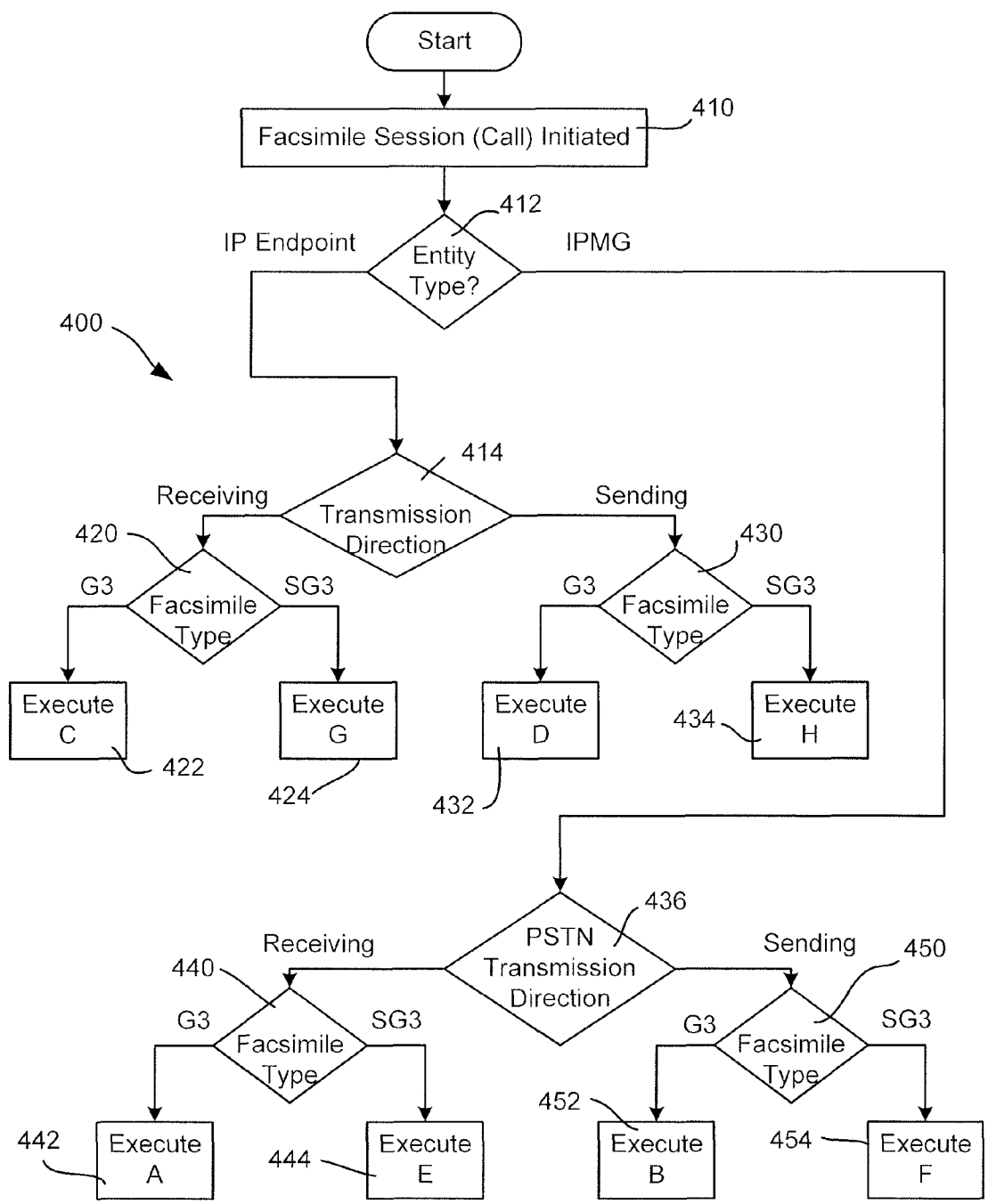
FIG. 4 is a flowchart illustrating an exemplary embodiment of overall operation of the systems and methods of the present disclosure.

Referring now to FIG. 4, a flowchart 400 illustrates a process for determining a decision process that can be executed depending on relevant parameters. Flowchart 400 represents an implementation of a decision process in either an IP endpoint, such as IP endpoint 300, or an IP Media Gateway, such as IP Media Gateway 200. Accordingly, while flowchart 400 indicates a differentiation between an IP endpoint and an IP Media Gateway, the actual implementation of the decision process is provided either in an IP endpoint or in an IP Media Gateway—that is, the decision process may differ based on implementation in an IP endpoint or in an IP Media Gateway. For example, while flowchart 400 indicates a determination of entity type, such as IP endpoint or IP Media Gateway, such a determination may not be realized in hardware or software, but rather in the implementation of the decision process in either an IP endpoint or an IP Media Gateway.

Flowchart 400 illustrates the initiation of a facsimile session or call in a block 410. Decision block 412 indicates an implementation differentiation between an IP endpoint and an IP Media Gateway to distinguish between the different handling of silence suppression in the different implementations. If decision block 412 indicates an implementation in an IP endpoint such as a facsimile IP endpoint 300 (FIG. 3), processing can be continued as illustrated at decision block 414. When the implementation is in an IP Media Gateway, such as IP Media Gateway 200 (FIG. 2), the corresponding branch of decision block 412 is taken. Block 412 may be omitted if the implementation is crafted specifically for an IP endpoint, such as IP endpoint 300, or for an IP Media Gateway, such as IP Media Gateway 200. The intelligence of the determination of the entity type may be embodied in the implementation of a given entity, e.g., the IP endpoint or the IP Media Gateway.

Decision block 414 indicates a determination of the direction of the facsimile transmission with respect to the IP endpoint, e.g., whether IP endpoint 300 is receiving or sending. If IP endpoint 300 determines that a facsimile transmission is being received, a facsimile type is determined as illustrated at decision block 420. If a G3 type facsimile is being received, decision block 420 illustrates the selection of decision process C, shown in block 422. If the facsimile type is SG3, decision block 420 depicts the determination that decision process G, shown in block 424, is chosen for execution.

Decision block 414 indicates that if the facsimile IP endpoint transmission is outgoing, i.e., transmitting facsimile data, a determination of facsimile type is made, as depicted in decision block 430. If the facsimile type is detected as type G3, decision process D is executed, as indicated in block 432. If the facsimile type is SG3, decision process H is executed, as indicated in block 434. The determination of facsimile type, i.e., G3 or SG3, can be implemented in the controller 352 or line control 332 in IP endpoint 300 illustrated in FIG. 3. The knowledge or intelligence of facsimile type available to the IP endpoint for determining facsimile type, as depicted in decision blocks 420 and 430, can be used as a basis of assumptions for implementing silence suppression in the IP endpoint. For example, since G3 type facsimile transmissions are half duplex, an assumption can be made in the configuration of the IP endpoint that when G3 facsimile transmissions are received, silence can be suppressed on an outgoing or transmitting basis. Assumptions such as these can be implemented in the configuration of the IP endpoint, without necessarily employing a facsimile signal detector because of the knowledge or intelligence built into the IP endpoint configuration.

When the entity type is an IP Media Gateway, as depicted in decision block 412, the PSTN transmission direction is detected as depicted in decision block 436. The PSTN transmission direction is detected as that of a sending or receiving facsimile transmission with respect to the PSTN. If the PSTN is receiving a facsimile transmission, a determination of facsimile type is made as depicted in decision block 440. Decision block 440 illustrates the detection of a G3 type facsimile transmission, leading to the execution of decision process A, as indicated in block 442. Decision block 440 illustrates the detection of an SG3 type facsimile transmission, leading to the execution of decision process E as indicated in block 444.

If the PSTN is detected as sending a facsimile transmission through the IP Media Gateway, as depicted in decision block 436, the facsimile type is detected, as illustrated in decision block 450. If the facsimile type is G3, decision block 450 illustrates the execution of decision process B in block 452. Decision block 450 indicates execution of decision process F when the facsimile type is detected as an SG3 facsimile transmission is being sent from the PSTN to the IP Media Gateway, as illustrated in block 454.

While a number of different decision processes are indicated above, some of these decision processes may be the same, or be implemented as the same decision process, and produce the same or a different operational result. The decision process executed, as determined in flow chart 400, can provide flexibility for implementation of the disclosed systems and methods of the present disclosure. For example, certain switches in hardware or software can be implemented in dependence upon whether the decision process is implemented in an IP endpoint or in an IP Media Gateway, while incorporating similar programming in the available implementation options. For the purposes of explanation, decision processes A-H are discussed below with reference to the flow charts in the accompanying drawings for each relevant decision process.

Figure 5:
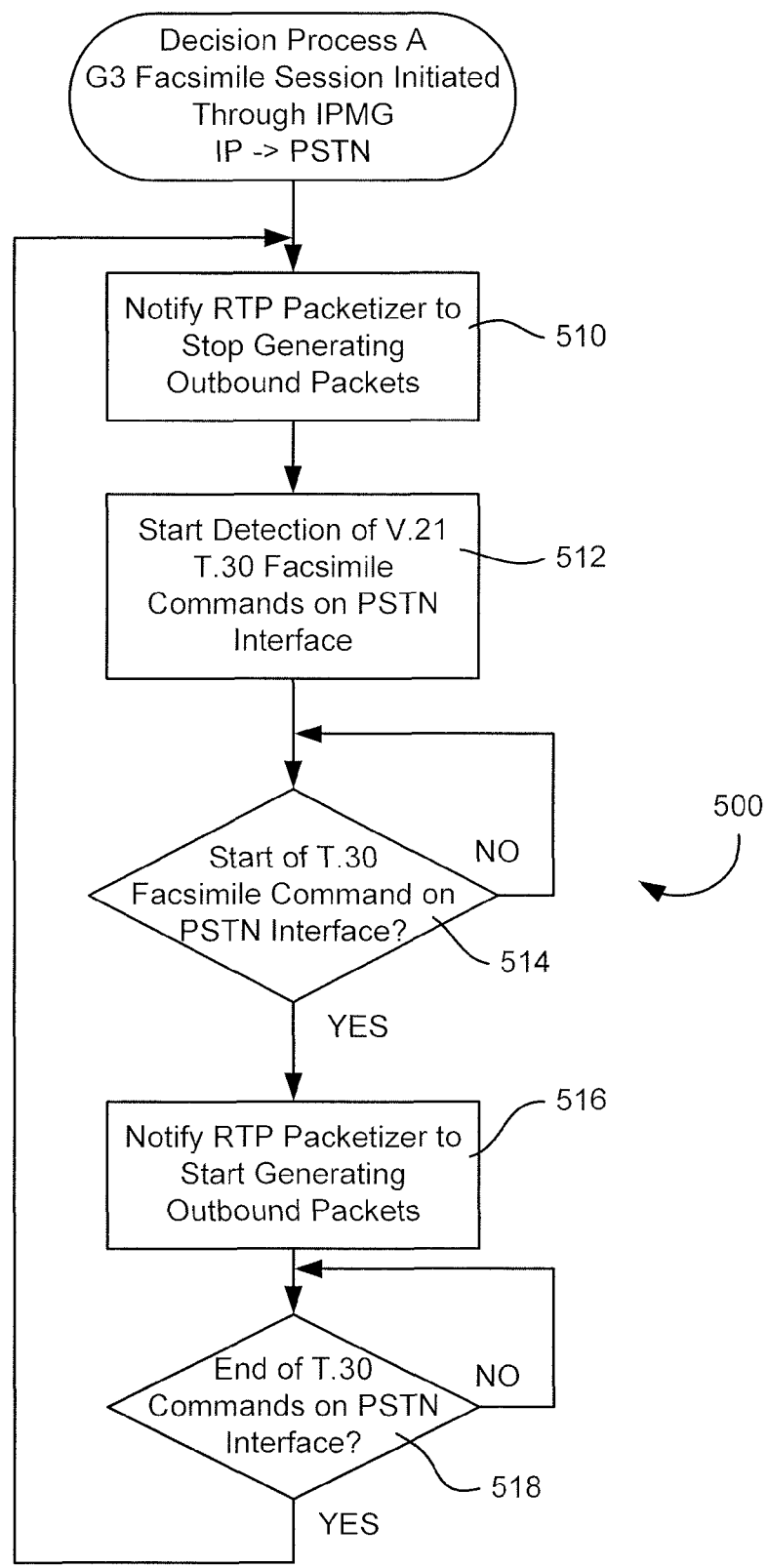
FIGS. 5-10 are flowcharts illustrating various exemplary embodiments of decision process implementations in accordance with the present disclosure.

Referring now to FIG. 5, as well as FIGS. 2 and 4, a flowchart 500 illustrates execution of a decision process path for case A of Table 1 above. As flowchart 400 illustrates for case A, the type of facsimile transmission is G3, the type of entity implementing the decision process is an IP Media Gateway and the facsimile message source is a PSTN endpoint receiving a facsimile transmission. The decision process illustrated in flowchart 500 is described with reference to the IP Media Gateway 200 illustrated in FIG. 2.

The decision process begins with block 510 of FIG. 5, where the RTP packetizer is signalled to stop generating outbound packets. For example, controller 242 initially notifies RTP encoder 236 to stop generating outbound packets. In this instance, when RTP encoder 236 stops generating outbound packets, silence is suppressed in that no RTP packets are returned back though IP network 221 from IP Media Gateway 200.

In block 512, the IP Media Gateway looks for a facsimile command on the PSTN interface that is directed to the IP network. For example, controller 242 looks for an indication of a facsimile signal arriving from PSTN interface 210, as may be indicated by facsimile signal detector 233, which can detect a V.21 T.30 facsimile command originating from PSTN 211. Upon detection of such a facsimile command, as indicated by the YES path of decision block 514, the RTP packetizer is notified to start generating outbound packets. For example, controller 242 notifies RTP encoder 236 to start generating outgoing packets, effectively disabling silence suppression. The notification process is indicated in block 516 of flowchart 500. Decision block 514 also illustrates the continued facsimile message detection to check for T.30 facsimile commands from PSTN interface 210. The NO path taken from decision block 514 loops back to the input to form a loop for continued checking. The detection of a T.30 facsimile command can be indicated to controller 242 in a number of ways, including through hardware or software interrupts or through polling.

Decision block 518 illustrates checking PSTN interface 210 for an end of the detected T.30 command. For example, facsimile signal detector 233 checks to see if the end of the T.30 commands from PSTN interface 210 is received. If the end of the T.30 commands is not detected, the process continues to check for the end of the T.30 command as indicated by the NO branch of decision block 518. If the end of the T.30 commands is detected, processing branches along the YES path to the beginning of flow chart 500 where silence suppression is re-enabled. For example, controller 242 notifies RTP encoder 236 to stop generating outbound packets to enable silence suppression. Accordingly, IP Media Gateway 200, upon determining a G3 passthrough facsimile session is established with PSTN 211 on the receiving side, causes silence to be suppressed, or disables packets from being sent from RTP encoder 236. The silence suppression continues until the start of an incoming T.30 message is detected from PSTN 211, at which point silence suppression ceases. Upon detection of the end of T.30 message by facsimile signal detector 233, IP Media Gateway 200 again begins to suppress silence, using command signals from controller 242 applied to RTP encoder 236. This process continues for all T.30 messages until the call is terminated.

In accordance with another exemplary embodiment, decisions to suppress silence may be founded on the facsimile signals received from IP network 221. The G3 facsimile transmissions are completely half-duplex, so that data is carried in a single transmission direction at any given time. When IP Media Gateway 200 receives a facsimile message from IP network 221 directed to PSTN 211, the message travels along pathway 240 and is detected as a facsimile message by facsimile signal detector 245, which provides an indication to controller 242 of the type of facsimile transmission.

Because the facsimile transmission occurs in IP Media Gateway 200, controller 242 may be implemented to incorporate the knowledge that the facsimile arrived from facsimile signal detector 245 via pathway 240 to determine a decision process to execute. In such an instance, the facsimile transmission travels through IP Media Gateway 200 from IP network 221 to PSTN 211, and is detected by facsimile signal detector 245. Controller 242 then implements facsimile silence suppression according to case A when facsimile signal detector 245 indicates that the type of facsimile is G3. Accordingly, IP Media Gateway 200, through controller 242, can suppress silence at RTP encoder 236 when the beginning of a T.30 message, training, or image data is detected from IP network 221 during the call. Controller 242 can cease silence suppression upon detection of the end of a T.30 message, training or image data from IP network 221 while the call is still active. Accordingly, by detecting a G3 type facsimile transmission from IP network 221, the disclosed system and method can take advantage of the half-duplex nature of the G3 facsimile transmission to implement silence suppression for facsimile messages that might otherwise be transmitted onto IP network 221. Thus, when G3 facsimile messages are determined to be arriving from IP network 221, facsimile signal detector 233 need not be employed to detect facsimile messages from PSTN 211 to implement silence suppression, for example.

Figure 6:
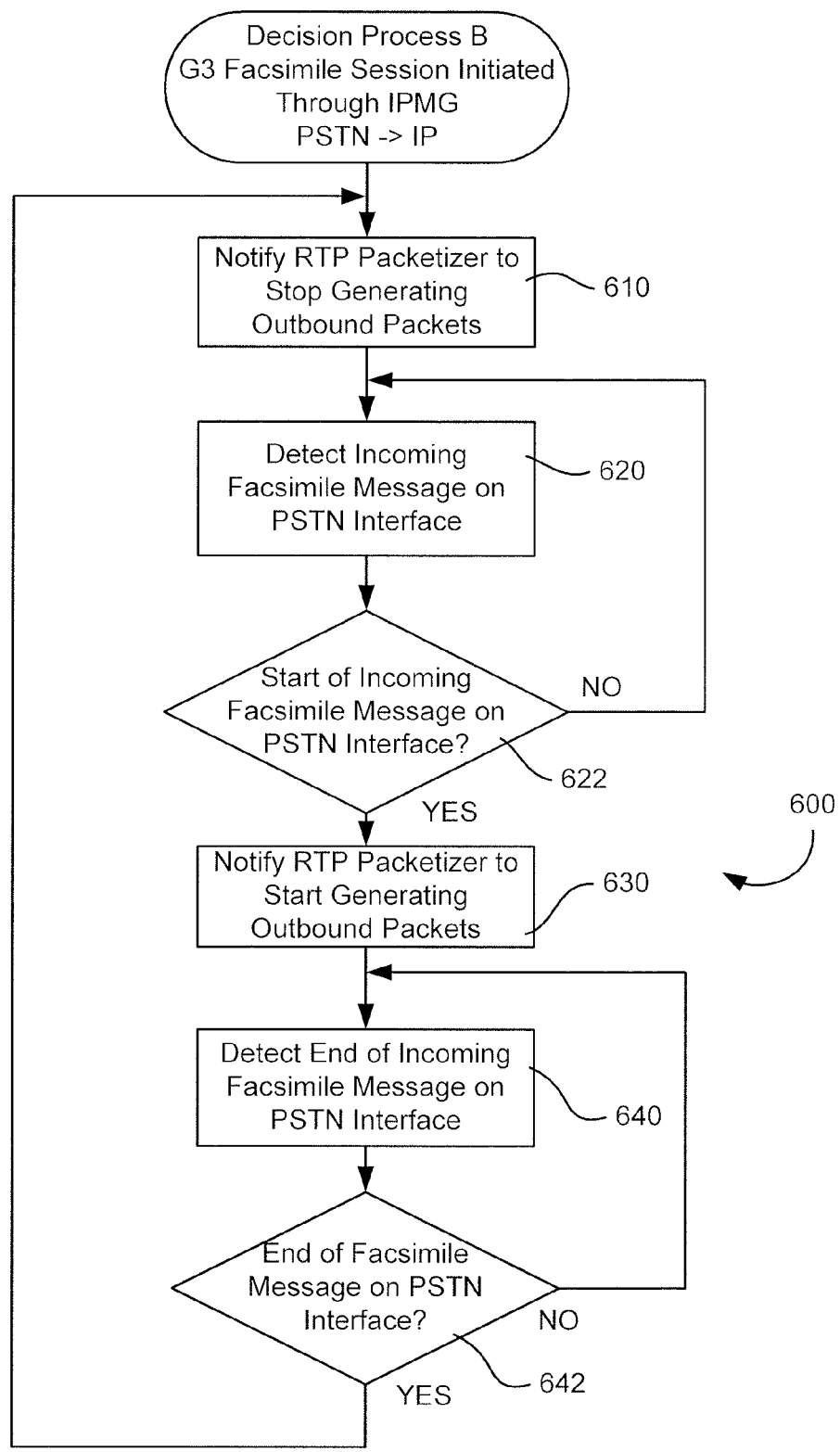

Referring now to FIG. 6, as well as FIGS. 2 and 4, a flowchart 600 illustrates an implementation of a silence suppression decision process according to the present disclosure in the exemplary embodiment of case B of Table 1. As flowchart 400 illustrates for case B, the process illustrated with flowchart 600 determines that the type of facsimile transmission is G3, where the facsimile transmission passes through IP Media Gateway 200 from PSTN 211 to IP network 221. In block 610, the RTP packetizer is signalled to stop generating outbound packets. For example, IP Media Gateway 200, through controller 242, indicates to RTP encoder 236 to stop generating and/or sending outbound packets to IP network 221. The process in block 610 can be viewed as a default action to suppress silence until a facsimile message is sent to IP Media Gateway 200 from PSTN 211. Silence suppression can commence at the beginning of the decision process illustrated in flow chart 600, as a default when a G3 facsimile type transmission originates from the PSTN 211 and passes through IP Media Gateway 200, assuming that the facsimile session or call initiation is complete and no facsimile messages have been received from PSTN interface 210.

With silence suppression enabled, the decision process proceeds to a block 620, where facsimile messages arriving from PSTN interface 210 are detected. The arriving facsimile messages may be detected with facsimile signal detector 233 illustrated in FIG. 2. The facsimile messages detected in block 620 can be facsimile commands such as V.21 T.30 facsimile commands, training data, or image data originating from PSTN 211 through PSTN interface 210, for example. Accordingly, when a facsimile transmission originates from PSTN 211, facsimile commands, training data, or image data can be detected and used to disable silence suppression.

Decision block 622 indicates the determination of when a facsimile message is detected as arriving at PSTN interface 210. If an incoming facsimile message is detected, as illustrated in decision block 622, silence suppression is disabled as indicated by the YES branch leading to block 630. Otherwise, the process continues checking for incoming facsimile messages at PSTN interface 210, as indicated by the NO branch to the input of block 620. The incoming facsimile message is detected, for example, by facsimile signal detector 233, which provides an indication to controller 242. The result is indicated in a block 630, where the RTP packetizer is notified to permit the generation and/or transmission of outbound packets. For example, RTP encoder 236 is enabled to generate and/or transmit packets to IP network 221 in accordance with block 630.

Once silence suppression is disabled in accordance with block 630, the decision process begins to check for the end of the incoming facsimile message from the PSTN interface 210, as illustrated in block 640. The incoming facsimile message can be in the form of a T.30 facsimile command, training data or image data originating from PSTN 211. Block 640 indicates the detection of the end of the incoming facsimile message, and is not limited to detecting an end of the message detected in block 620. For example, facsimile signal detector 233 can be used to detect the end of a T.30 facsimile command, training data or image data originating from PSTN 211, and to so notify controller 242 upon such detection. Once an end of an incoming facsimile message from PSTN interface 210 is detected, the decision process returns to implementing silence suppression as indicated by the YES branch of decision block 642 returning to the input of block 610. If the end of the incoming facsimile message is not detected, the process continues to check for the end of the incoming facsimile message, as indicated with the NO branch of decision block 642 returning to the input of block 640.

By execution of the decision process illustrated in flowchart 600, silence suppression can be turned on to prevent silence from being transmitted from IP Media Gateway 200 to IP network 221, for example, when no facsimile messages are detected as incoming on PSTN interface 210. Upon detection of an incoming facsimile message on PSTN interface 210, IP Media Gateway 200 disables silence suppression to permit packets to be generated and/or transmitted to IP network 221. Upon detection of the end of the facsimile message, silence suppression is enabled to avoid the generation and/or the transmission of packets from IP Media Gateway 200 on IP network 221.

While flowchart 600 illustrates a technique for silence suppression based on the detection of incoming facsimile messages from PSTN interface 210, other bases for determining when to employ silence suppression are available and understood. For example, silence suppression decisions may be based on the receipt of G3 type facsimile signals received from IP network 221. Because G3 type facsimile signals are half duplex in nature, both the sending and receiving facsimile transmission participants do not transmit at the same time. Accordingly, silence suppression can be implemented in IP Media Gateway 200 to be enabled with the detection of a T.30 facsimile message arriving from IP network 221. In such an arrangement, facsimile signal detector 245 can be employed to enable silence suppression when a G3 type facsimile transmission arrives from IP network 221. Silence suppression can also be enabled using facsimile signal detector 233, such as by detecting when an end of the T.30 facsimile message is detected when the G3 type facsimile transmission originates from PSTN 211. Accordingly, silence suppression can be implemented based on knowledge of a content of a facsimile message or a facsimile message type, for example.

Figure 7:
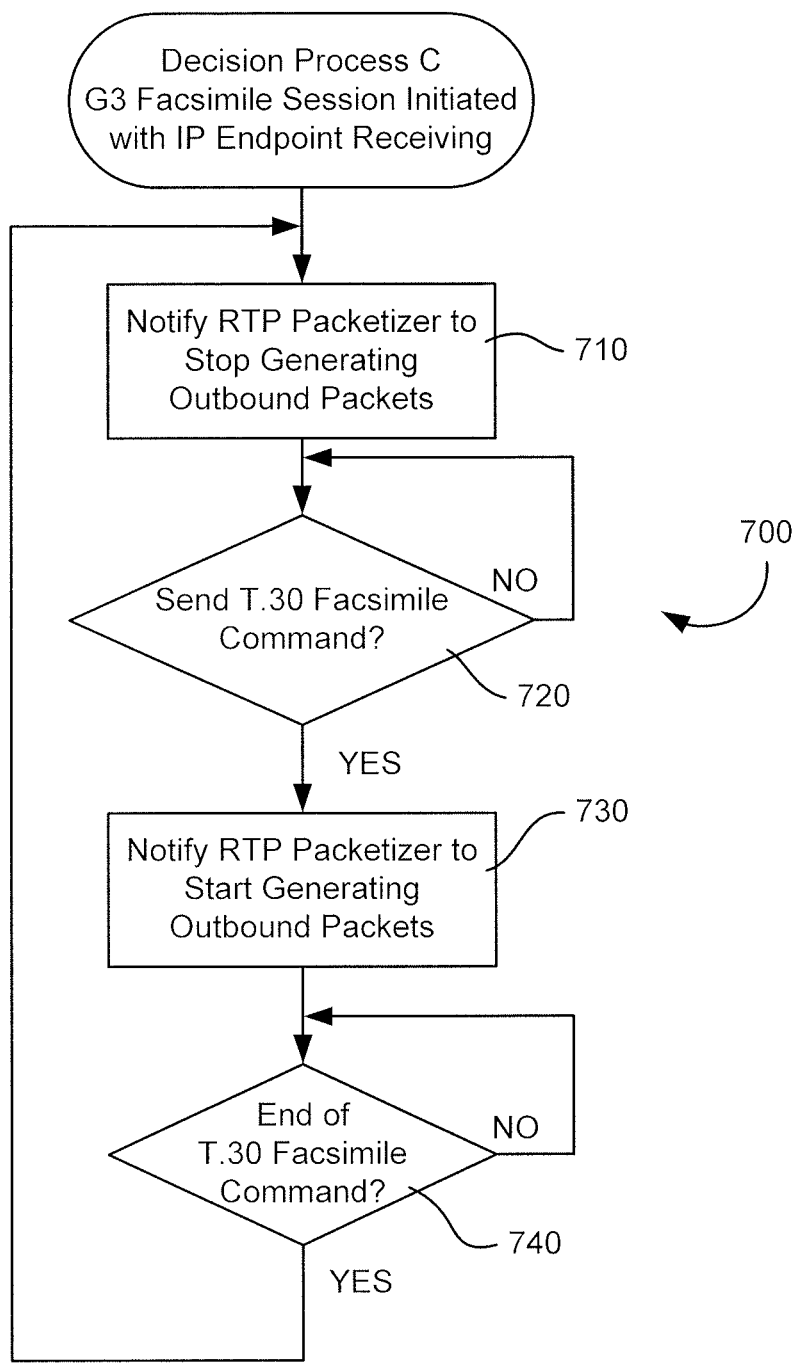

Referring now to FIG. 7 in conjunction with FIGS. 3 and 4, decision process C is illustrated in flow chart 700 for an IP endpoint receiving G3 type facsimile transmissions. As illustrated in block 422 of FIG. 4, decision process C is indicated after a facsimile session is initiated when IP endpoint 300 receives a G3 type facsimile transmission. Decision process C illustrated in flow chart 700 proceeds to block 710 in which an RTP packetizer in IP endpoint 300 is notified to cease the generation and/or transmission of outbound packets. For example, controller 352 signals RTP encoder 334 to cease the generation and/or transmission of packets onto IP network 321, effectively enabling silence suppression. Processing continues to block 720, which determines if an outbound facsimile message is available, such as a T.30 facsimile command. If no outbound facsimile message is available, decision process C illustrated in flow chart 700 continues to check for an outbound facsimile message as indicated by the NO branch returning to the input of decision block 720. If an outbound facsimile message is available, silence suppression can be disabled, as indicated by the YES branch of decision block 720 directed to block 730. Block 730 indicates execution of decision process C to provide a notification to the RTP packetizer to permit the generation and/or transmission of packets from the IP endpoint to IP network 321. For example, controller 352 provides signalling to RTP encoder 334 to permit packets to be generated and/or transmitted to IP network 321. When RTP encoder 334 is permitted to generate and/or transmit packets, silence suppression is effectively disabled.

When silence suppression is disabled as indicated in block 730, decision process C checks for an end of the outbound facsimile message as indicated in decision block 740. If the end of the outbound facsimile message is not detected, decision process C continues to check until the end of the outbound facsimile message is reached, as indicated by loop formed by the NO branch returning to the input of decision block 740. Upon reaching the end of the outbound facsimile message, silence suppression is again enabled, as indicated by the YES pathway out of decision block 740, which returns to the input of block 710.

In the case of the IP endpoint illustrated in flow chart 700, there is no need to detect outbound facsimile signals, since the IP endpoint is the originator of the facsimile signals and is explicitly aware of when an outbound facsimile transmission is being sent. When the IP endpoint receives a G3 type passthrough facsimile transmission, silence can be suppressed at all times, except when the IP endpoint generates T.30 messages for controlling the facsimile transmission. However, a facsimile signal detector may be employed to detect inbound or outbound facsimile signals.

Figure 8:
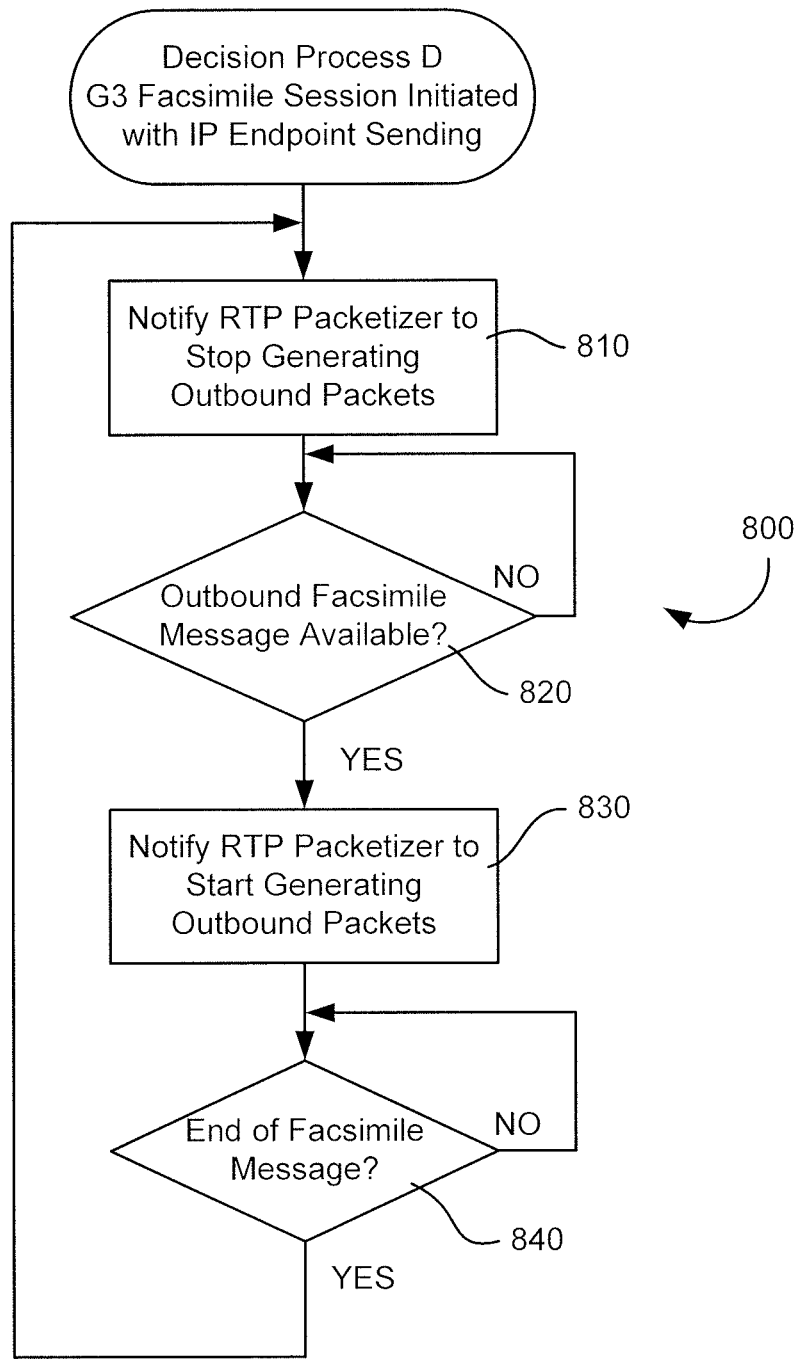

Referring now to FIG. 8, in conjunction with FIGS. 3 and 4, a flow chart 800 illustrating execution of decision process D is shown. As illustrated in FIG. 4, decision process D is indicated as being executed in block 432 as a result of an IP endpoint sending a G3 type facsimile transmission. In the process illustrated in flow Chart 800, a facsimile session has been initiated for a G3 type facsimile transmission.

When an IP endpoint is sending a G3 type facsimile transmission, silence can be suppressed during the initiation of the facsimile transmission and then disabled or enabled over the course of the facsimile transmission. A block 810 of flow chart 800 indicates the enablement of silence suppression by providing a notification to the RTP packetizer of the IP endpoint to cease generating and/or transmitting outbound packets. For example, controller 352 can instruct or notify RTP encoder 334 to cease generating and/or transmitting packets to IP network 321 to enable silence suppression at the outset of the facsimile session. The IP endpoint, as a facsimile transmission originator, is explicitly aware of when facsimile transmissions are made, such that there is no need to detect when an outbound facsimile transmission may occur. However, an outbound or inbound facsimile signal detector, or both, may also be used with the IP endpoint to detect when facsimile transmissions occur.

With silence suppression enabled, a determination can be made as to whether an outbound facsimile message is available, as indicated in decision block 820. If an outbound facsimile message is not available, decision process D continues to check for outbound facsimile messages, as indicated by loop formed by the NO path returning to the input of decision block 820. If an outbound facsimile message is available, silence suppression is disabled, as indicated by the YES branch of decision block 820 directed to block 830. Facsimile messages that may be made available on an outbound basis from the IP endpoint include T.30 facsimile commands, training data or image data. When any of these types of facsimile messages are made available for output by the facsimile IP endpoint, silence suppression can be disabled to permit the messages to be transported over IP network 321.

Block 830 illustrates the process of notifying the RTP packetizer to permit the generation and/or transmission of outbound packets. For example, controller 352 may instruct or notify RTP encoder 334 to permit packets to be generated and/or transmitted to IP network 321. While facsimile messages are being sent by the facsimile IP endpoint, silence suppression is disabled to permit the packets to be generated and transmitted without interruption. Once silence suppression is disabled, as illustrated in block 830, decision process D checks for the end of the facsimile message, as illustrated in decision block 840. If the outgoing facsimile message has not ended, decision process D continues to check the facsimile message status to look for an end of the facsimile message, as indicated by the loop formed with the NO path returning to an input of decision block 840. When an end of the facsimile message is detected, silence suppression is re-enabled by providing a notification to the RTP packetizer to stop generating outbound packets as indicated by the YES path of decision block 840 being directed to the input of block 810.

Figure 9:
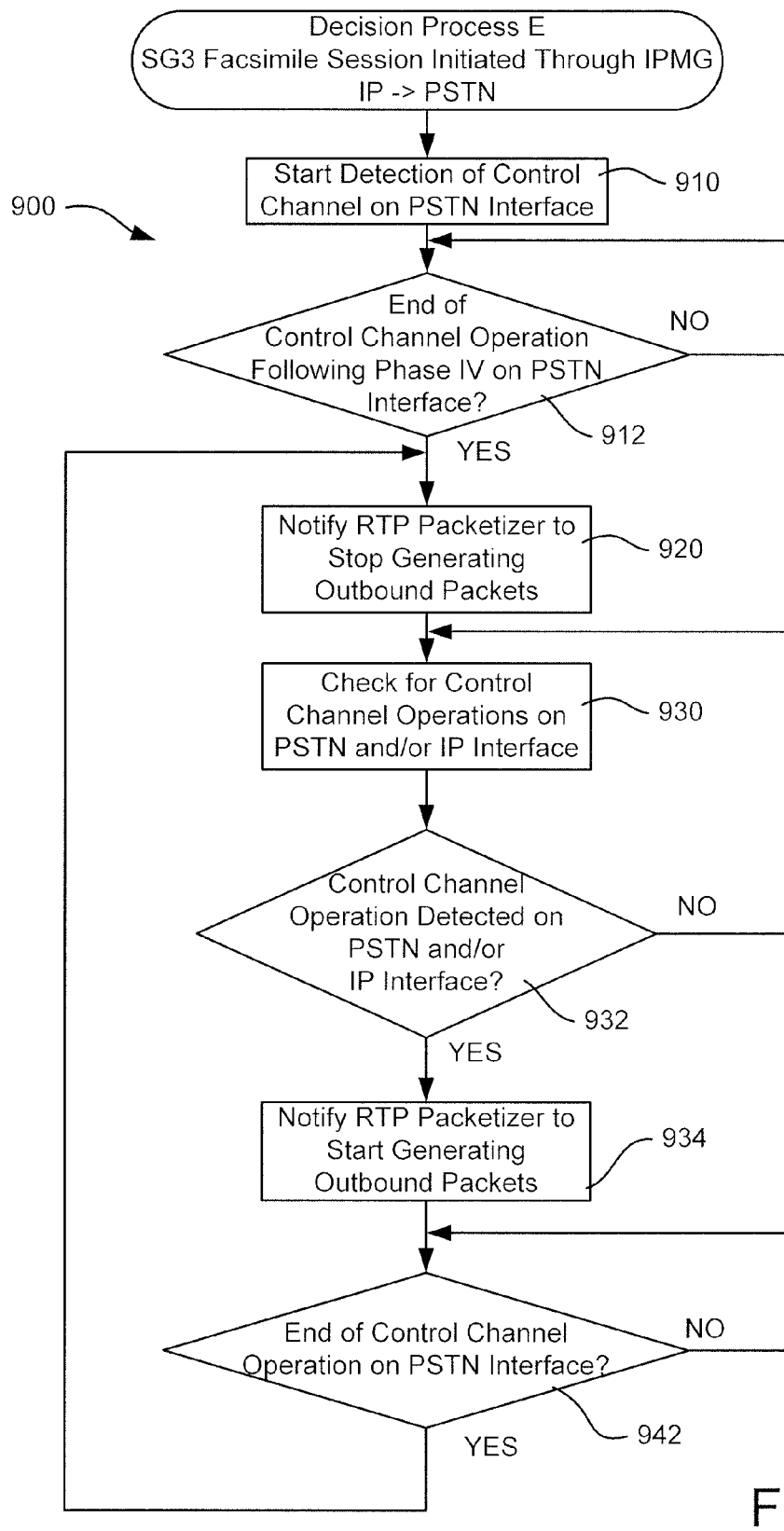

Referring now to FIG. 9, along with FIGS. 2 and 4, a flow chart 900 illustrates the execution of decision process E. FIG. 4 illustrates the selection of decision process E in block 444 based on an IP Media Gateway providing facsimile passthrough operations when the PSTN is receiving an SG3 type facsimile transmission. In flowchart 900, decision process E begins with a block 910 that is arrived at after the initiation of a facsimile session (call). Block 910 illustrates the portion of decision process E where the IP Media Gateway begins detection for a control channel on the PSTN interface. For example, facsimile signal detector 233 can detect a control channel operation on PSTN interface 210 and provide an indication of the same to controller 242 in IP Media Gateway 200. Detection of the end of the control channel operation following phase IV of the SG3 facsimile transmission is illustrated in decision block 912. If the end of the control channel operation is not detected, decision process E checks for the end of the control channel operation, as indicated by the loop formed by the NO branch returning to the input of decision block 912. When decision process E determines that the end of the control channel operation is detected, as depicted by decision block 912 following the YES branch, silence suppression is enabled, as indicated in block 920.

Block 920 illustrates execution of decision process E to signal the RTP packetizer to cease generating outbound packets. Initially, during call set up for the SG3 type facsimile transmission, silence suppression can be disabled since the four phases of the SG3 facsimile of the call set up are primarily full duplex in nature. It is possible to enable silence suppression operation during SG3 type facsimile call set up, and realize some bandwidth savings; however, such bandwidth savings may be relatively small in comparison with bandwidth usage and savings that may be obtained during transmission of facsimile data. In the exemplary embodiment illustrated in flow chart 900, silence suppression is disabled until the end of the low speed control channel operation for the SG3 type facsimile call set up on the PSTN interface for the IP Media Gateway. After the call set up phase, silence suppression can be enabled as illustrated in block 920, since the primary channel of an SG3 type facsimile call is half duplex.

After silence suppression is enabled, decision process E begins checking for control channel operations on the PSTN and/or IP network interfaces of the IP Media Gateway, as illustrated in block 930. If such an operation is detected on the PSTN or IP network interface, silence suppression is disabled, as illustrated with the YES branch from decision block 932 directed to block 934. If no operation on the PSTN or IP network interface is detected, silence suppression remains enabled and decision process E continues to check for operations on the PSTN and/or IP network interface, as illustrated with the loop formed by the NO branch of decision block 932 returning to the input of block 930.

Once control channel operations are detected on PSTN interface 210 and/or IP network interface 220 of IP Media Gateway 200, decision process E prompts a signal or notification to the RTP packetizer to begin generating and/or transmitting outbound packets for the IP network interface to the IP network, as indicated in block 934. For example, facsimile signal detector 233 and/or facsimile detector 245 indicate to controller 242 that an operation is detected on respective PSTN interface 210 and/or IP network interface 220. Controller 242 provides a signal or notification to RTP encoder 236 to permit packet generation and/or transmission, effectively disabling silence suppression.

Decision process E checks if an end of the control channel operation is detected on the PSTN interface, upon which silence suppression is enabled, as indicated by the YES pathway taken from decision block 942 to the input of block 920. If the end of the control channel operation is not detected, decision process E continues to check for the end of the control channel operation on the PSTN interface, as indicated by the loop formed with the NO branch returning to the input of decision block 942. The determination of the start and end of a control channel operation on PSTN interface 210 can be implemented in IP Media Gateway 200 with facsimile signal detector 233 and controller 242 checking PSTN interface 210. In this exemplary embodiment, silence suppression is disabled upon detection of the start of a control channel operation at the PSTN interface. The start of the control channel operation on the PSTN interface may be after the primary channel operations have stopped. Decision process E illustrated in flowchart 900 continues operating until the facsimile session (call) terminates.

In the case of decision process F according to the present disclosure, there maybe little benefit to employing silence suppression. In such a case, silence suppression may optionally be disabled. In practice, when the facsimile transmission device originates an SG3 type facsimile transmission from the PSTN, as in the case of decision process F, there is a relatively small amount of silence in comparison with facsimile data in the facsimile transmissions that pass through the IP Media Gateway. The benefit of bandwidth saved in such an implementation may be outweighed by other implementation factors such as reduced complexity, increased quality of facsimile transmission or operating costs, so that the implementation of silence suppression can optionally be employed or avoided in such a case.

Figure 10:
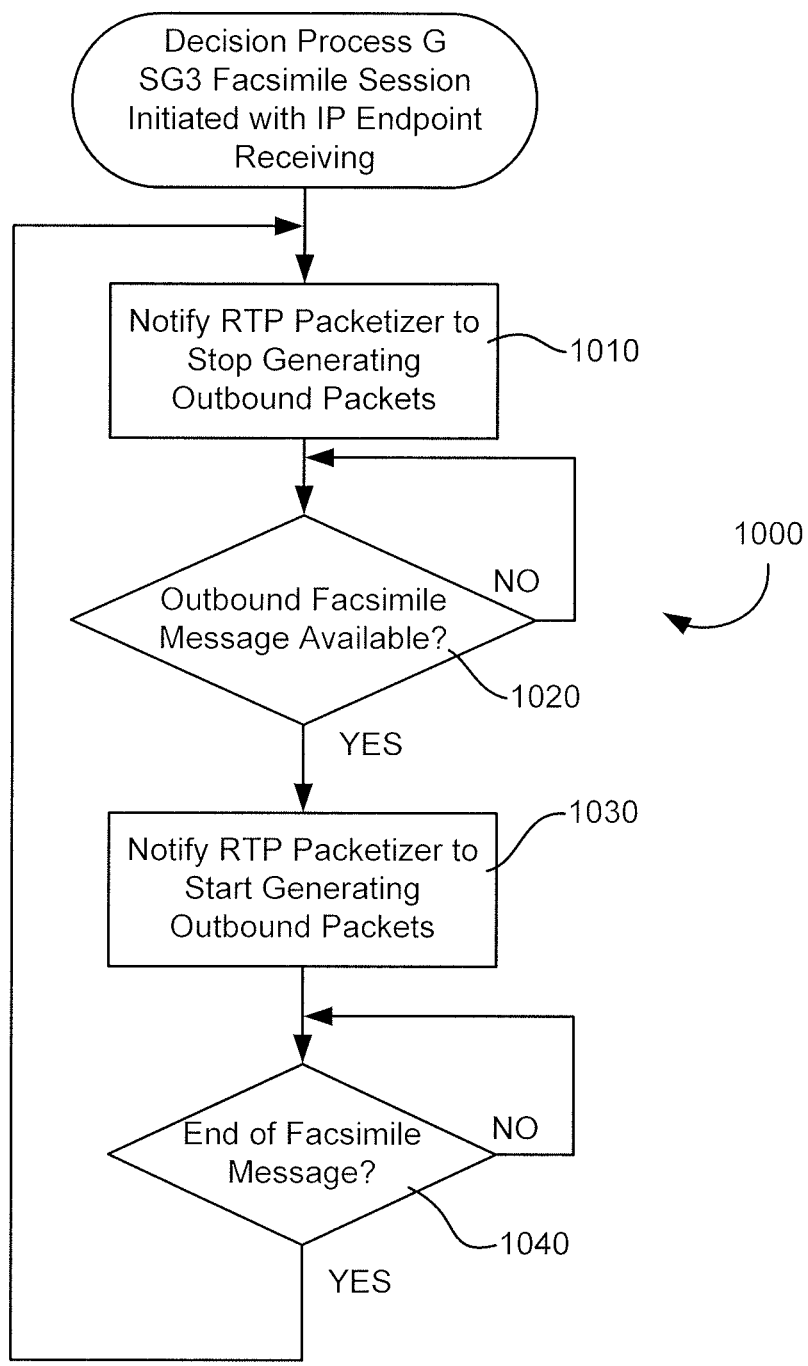

Referring now to FIG. 10, a flowchart 1000 illustrates an exemplary implementation of the decision process G for silence suppression in an IP endpoint receiving an SG3 type facsimile transmission. Decision process G illustrated in flow chart 1000 begins by enabling silence suppression as indicated in block 1010. The RTP packetizer in the IP endpoint is notified to cease generating and/or transmitting outbound packets, as indicated in block 1010. For example, controller 352 provides a signal or notification to RTP encoder 334 to cease generating and/or sending packets to IP network 321, thereby permitting silence suppression to be enabled. Decision process G then determines if outbound facsimile messages are available for transmission, as indicated in decision block 1020. If no outbound facsimile messages are available for transmission, decision process G continues to check if outbound facsimile messages are available, as indicated by the loop formed with the NO branch returning to the input of decision block 1020. If an outbound facsimile message is available for transmission, silence suppression is disabled, as illustrated with the YES path of decision block 1020 being directed to block 1030. Block 1030 indicates execution of decision process G to notify the RTP packetizer to permit generation and/or transmission of outgoing packets. For example, controller 352 signals RTP encoder 334 based on input from line control 332 to permit packets to be generated and/or transmitted to IP network 321, effectively disabling silence suppression.

Once silence suppression is disabled, decision process G determines whether the end of the outbound facsimile message has been reached, as illustrated in decision block 1040. The determination can be made by controller 352 based on the input received from line control 332 of facsimile IP endpoint 300. If the end of the outbound facsimile message has not been reached, decision process G continues to check for the end of the output facsimile message, as illustrated by the loop formed by the NO pathway returning to the input of decision block 1040. If the end of the facsimile message is reached, silence suppression is re-enabled, as indicated by the YES path of decision block 1040 returning to the input of block 1010.

The process illustrated in flowchart 1000 provides silence suppression for an IP endpoint receiving an SG3 type facsimile transmission, where outbound facsimile messages are used to control the transmission. Accordingly, silence suppression is employed when an outbound facsimile message is not available to be sent, e.g., when the facsimile IP endpoint is not sending SG3 facsimile control messages. Otherwise, when the facsimile IP endpoint is sending SG3 facsimile control messages, silence suppression is disabled to permit packets to be generated and/or sent over IP network 321.

The IP endpoint executing decision process G illustrated in flowchart 1000 need not detect outbound facsimile signals, since the IP endpoint is aware of the outbound facsimile signals as the originator of those signals. Accordingly, when the IP endpoint receives an SG3 facsimile transmission, silence can be suppressed when the primary channel is active, i.e., when the IP endpoint is receiving primary channel data from the IP network. Alternatively, or in addition, the IP endpoint can implement a facsimile signal detector to determine when facsimile signals are to be sent or received, and/or the type of facsimile transmission in use to implement silence suppression.

With respect to decision process H of the present disclosure, an IP endpoint sending an SG3 type facsimile transmission can optionally employ or avoid the use of silence suppression when acting as the source facsimile terminal. The SG3 type facsimile transmission from the IP endpoint typically generates mostly data as the source terminal. Accordingly, the relatively small amount of silence in comparison to the amount of data generated with the SG3 type facsimile transmission may provide little advantage in implementing silence suppression in this case. However, implementation of silence suppression is possible in this situation albeit with potentially small bandwidth saving being achieved.

The operations herein described are purely exemplary and imply no particular order. Further, the operations can be used in any sequence when appropriate and can be partially used. With the above embodiments in mind, it should be understood that the invention can employ various computer-implemented operations involving data transferred or stored in computer systems. These operations are those requiring physical manipulation of physical quantities. Usually, though not necessarily, these quantities take the form of electrical, magnetic, or optical signals capable of being stored, transferred, combined, compared and otherwise manipulated.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines employing one or more processors coupled to one or more computer readable medium, described below, can be used with computer programs written in accordance with the teachings herein, or it may be more convenient to construct a more specialized apparatus to perform the required operations.

The disclosed system and method can also be embodied as computer readable code on a computer readable medium. The computer readable medium is any data storage device that can store data, which can be thereafter be read by a computer system. Examples of the computer readable medium include hard drives, read-only memory, random-access memory, CD-ROMs, CD-Rs, CD-RWs, magnetic tapes and other optical and non-optical data storage devices. The computer readable medium can also be distributed over a network-coupled computer system so that the computer readable code is stored and executed in a distributed fashion.

The foregoing description has been directed to particular embodiments of this invention. It will be apparent, however, that other variations and modifications may be made to the described embodiments, with the attainment of some or all of their advantages. The procedures, processes and/or modules described herein may be implemented in hardware, software, embodied as a computer-readable medium having program instructions, firmware, or a combination thereof. For example, the function described herein may be performed by a processor executing program instructions out of a memory or other storage device. Therefore, it is the object of the appended claims to cover all such variations and modifications as come within the true spirit and scope of the invention.

What is claimed is:

1. A device for processing a facsimile transmission that includes a packet switched network interface for connection to a packet switched network, comprising:
    a packet handler coupled to the packet switched network interface, the packet handler being configured, during a facsimile call:
        to receive facsimile data;
        to generate a facsimile transmission packet containing the facsimile data; and
        to transmit the facsimile transmission packet to the packet switched network via the packet switched network interface; and
    a controller coupled to the packet handler, the controller being configured, responsive to the facsimile data and to a content of the facsimile transmission;
        to determine whether the content of the facsimile transmission includes one or more of a facsimile command and training data; and
        having determined that the content of the facsimile transmission does not include one or more of the facsimile transmission command and training data, to perform a process of silence suppression, the process of silence suppression including:
            determining whether the facsimile data includes silence; and
            having determined that the facsimile data includes the silence, providing a first signal to the packet handler to prevent the packet handler from one or more of generating and transmitting the facsimile transmission packet containing the silence to the packet switched networks without terminating the facsimile call, thereby reducing a bandwidth utilization on the packet switched network during the facsimile transmission,
    wherein the controller is further configured, having determined that the content of the facsimile transmission includes one or more of the facsimile command and the training data, to disable the process of silence suppression.

2. The device according to claim 1, further comprising:
    a Public Switched Telephone Network (PSTN) interface for connection to a PSTN to permit the facsimile transmission to be sent to or received from the PSTN.

3. The device according to claim 1, further comprising:
    a facsimile transmission detector coupled to the packet switched network interface and to the controller, the facsimile transmission detector being configured to indicate to the controller when the facsimile transmission is received at the packet switched network interface.

4. The device according to claim 2, further comprising:
    a facsimile transmission detector coupled to the PSTN interface and to the controller, the facsimile transmission detector being configured to indicate to the controller when the facsimile transmission is received at the PSTN interface.

5. The device according to claim 2, wherein the facsimile transmission detector is configured to detect a G3 type facsimile transmission or an SG3 type facsimile transmission being received at the packet switched network interface.

6. The device according to claim 4, wherein the facsimile signal detector is configured to detect a G3 type facsimile transmission or an SG3 type facsimile transmission being received at the PSTN interface.

7. The device according to claim 1, wherein the content relates to whether the facsimile transmission is a G3 type facsimile transmission or an SG3 type facsimile transmission.

8. The device according to claim 1, wherein the content relates to whether the facsimile transmission is being sent to or received from the packet switched network interface.

9. The device according to claim 8, wherein the content relates to whether a facsimile command is being sent to or received from the packet switched network interface.

10. The device according to claim 8, wherein the content relates to whether one or more of the facsimile command, the training data, or image data is being sent to or received from the packet switched network interface.

11. The device according to claim 1 wherein the controller is further configured, after having prevented the packet handler from one or more of the generating and the transmitting of the facsimile transmission packet containing the silence to the packet switched network during the facsimile call:
    to determine whether the content includes one or more of the facsimile command and the training data;
    having determined that the content includes one or more of the facsimile command and the training data, to provide a second signal to the packet handler to direct the packet handler to permit one or more of generating and transmitting facsimile transmission packets to the packet switched network; and
    to continue, until the facsimile call terminates, (1) providing the first signal to the packet handler upon the determination that the facsimile data includes the silence, and (2) providing the second signal to the packet handler upon the determination that the content includes one of the facsimile command and the training data.

12. A method of suppressing silence in a device for processing a facsimile transmission, the device including a packet switched network interface for connection to a packet switched network, the method comprising:

during a facsimile call, receiving (i) at a packet handler coupled to the packet switched network interface, facsimile data that is to be transmitted via the packet handler, and (ii) an indication of a content of the facsimile transmission being received from the packet switched network interface;

determining whether the content of the facsimile transmission includes one or more of a facsimile command and training data; and having determined that the content of the facsimile transmission does not include one or more of the facsimile transmission command and training data, performing a process of silence suppression, the process of silence suppression including:

determining whether the facsimile data includes silence; and having determined that the facsimile data includes the silence, providing a first signal to the packet handler to prevent the packet handler from one or more of generating and transmitting a facsimile transmission packet containing the facsimile data including the silence to the packet switched network without terminating the facsimile call, thereby reducing a bandwidth utilization on the packet switched network during the facsimile transmission; and having determined that the content of the facsimile transmission includes one or more of the facsimile command and the training data, to disable the process of silence suppression.

13. The method according to claim 12, further comprising:

detecting the facsimile transmission being sent to or received from the packet switched network interface.

14. The method according to claim 13, further comprising:

inspecting the content of the facsimile transmission to obtain the indication.

15. The method according to claim 13, further comprising:

detecting a facsimile transmission type of the facsimile transmission.

16. The method according to claim 15, further comprising:

detecting G3 facsimile transmission types or SG3 facsimile transmission types.

17. The method according to claim 12, further comprising:

determining whether the facsimile transmission is being sent to or received from the packet switched network interface.

18. The method according to claim 14, further comprising:

determining whether the facsimile transmission is the facsimile command.

19. The method according to claim 14, further comprising:

determining whether the facsimile transmission is one or more of the facsimile command, the training data, or image data.

20. The method according to claim 12 further comprising:

after having prevented the packet handler from one or more of the generating and the transmitting of the facsimile transmission packet containing the facsimile data including the silence during the facsimile call:

determining whether the content includes one or more of the facsimile command and the training data;

having determined that the content includes one or more of the facsimile command and the training data, providing a second signal to the packet handler to direct the packet handler to permit one or more of generating and transmitting facsimile transmission packets; and continuing, until the facsimile call terminates, (1) the providing of the first signal to the packet handler upon the determination that the facsimile data includes the silence, and (2) the providing of the second signal to the packet handler upon the determination that the content includes one or more of the facsimile command and the training data.

* * * * *